Oct. 30, 1928.  
T. GENSMER  
1,689,200  
TWO-SPEED AND REVERSING CLUTCH  
Filed Aug. 28, 1926  3 Sheets-Sheet 1
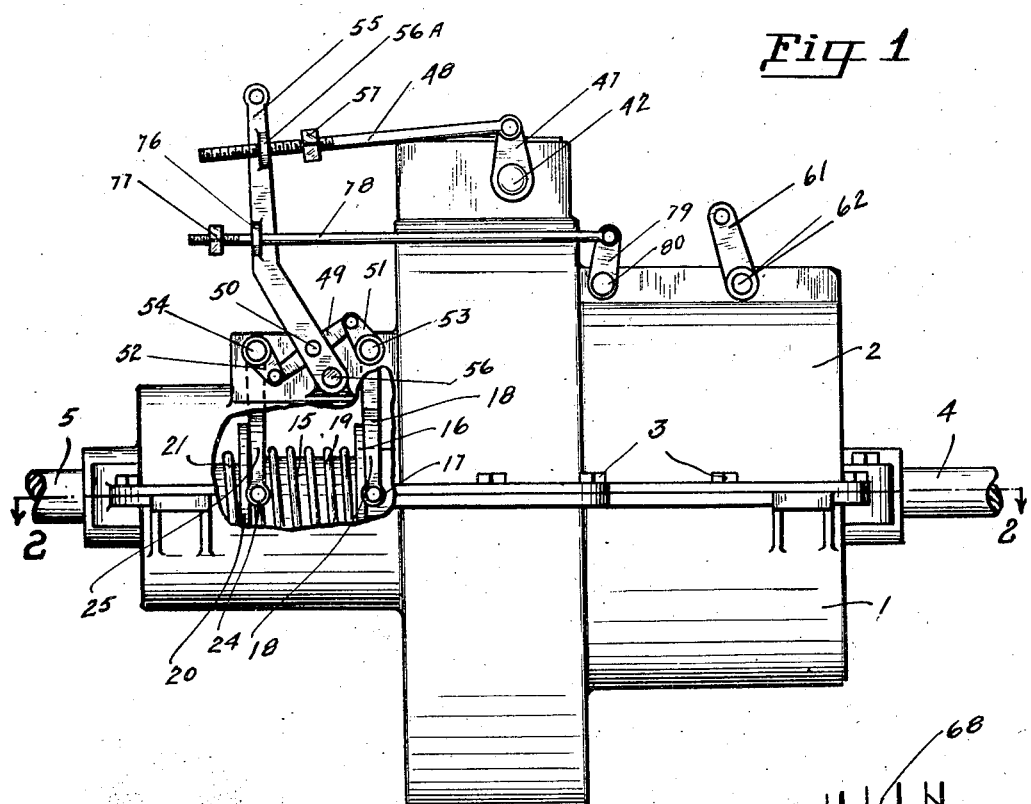
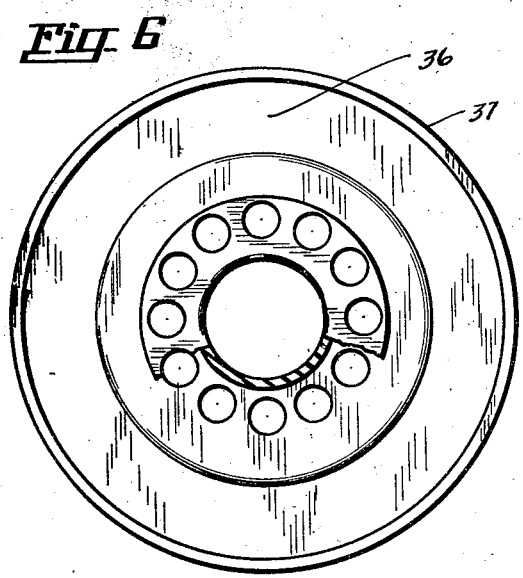
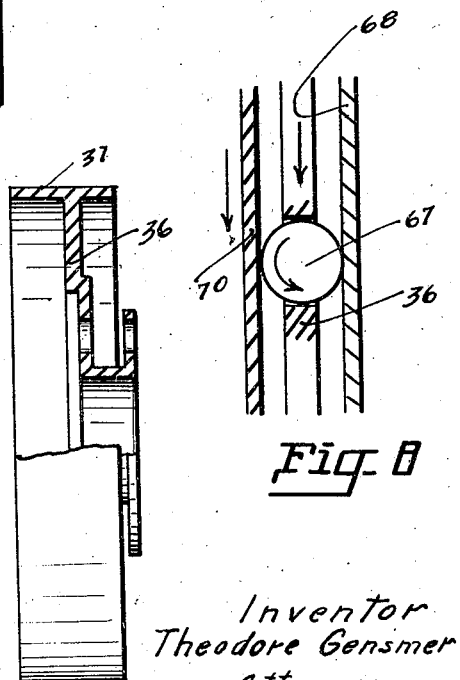
Inventor  
Theodore Gensmer  
Attorney

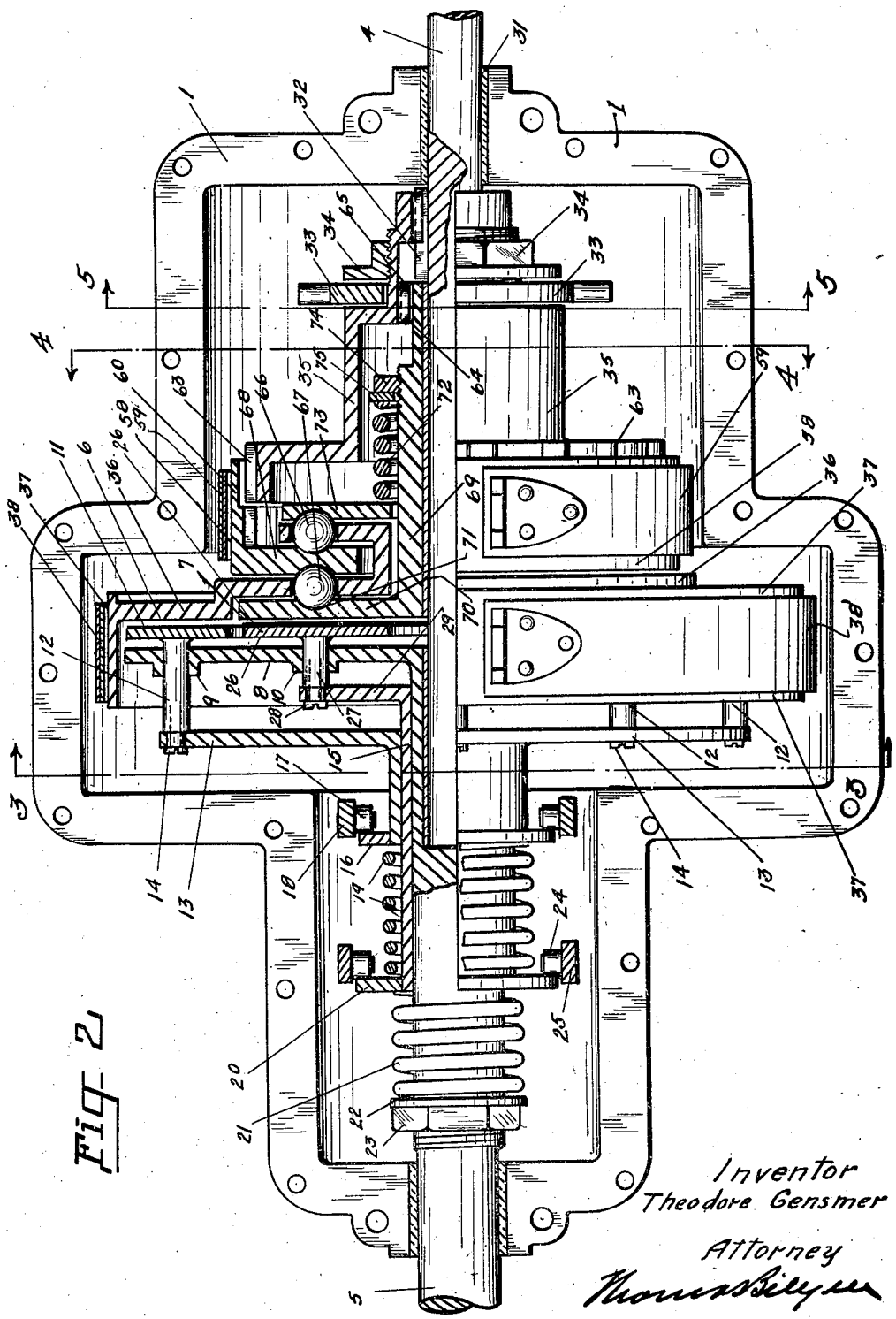

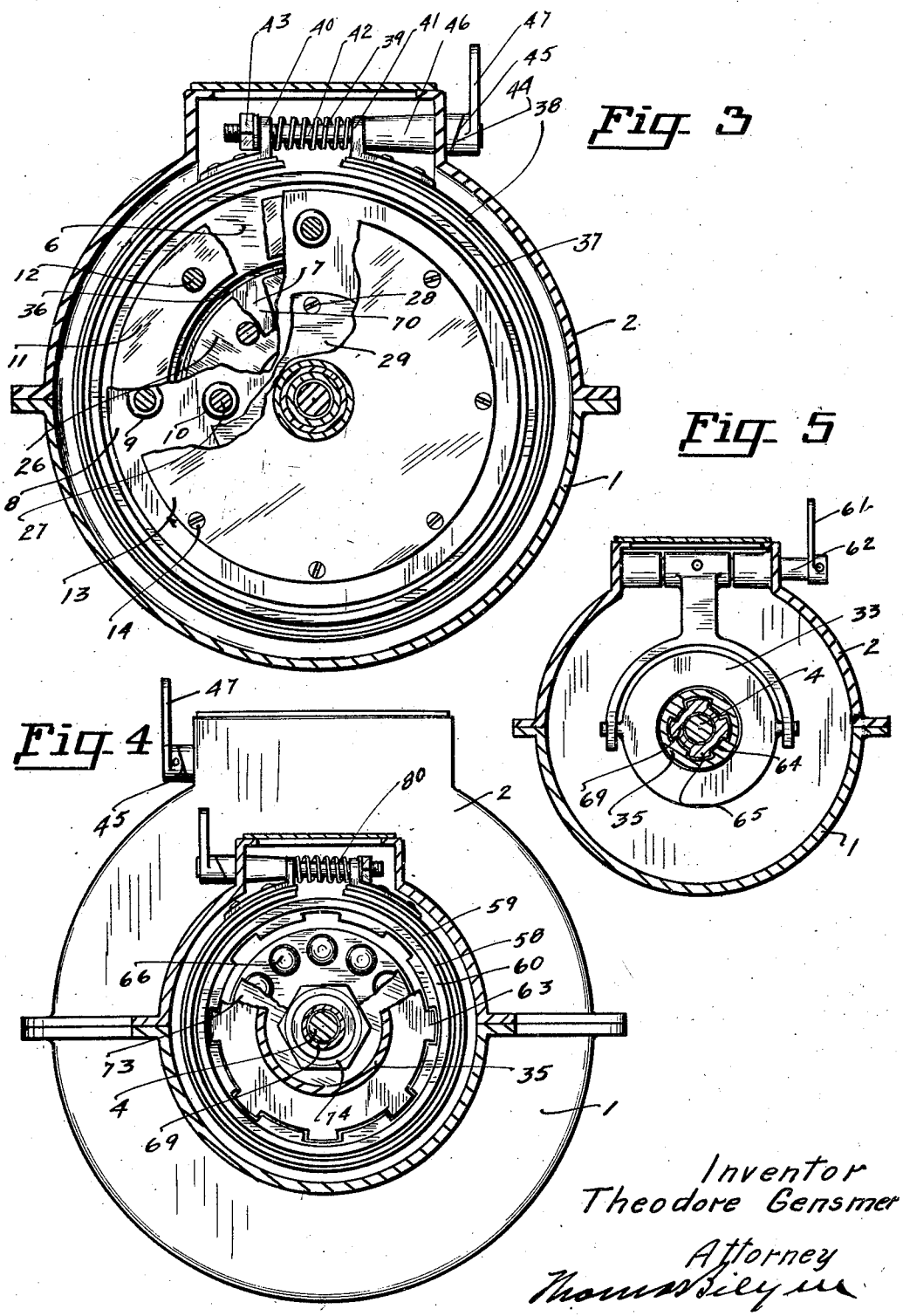

Patented Oct. 30, 1928.

1,689,200

UNITED STATES PATENT OFFICE.

THEODORE GENSMER, OF PORTLAND, OREGON.

TWO-SPEED AND REVERSING CLUTCH.

Application filed August 28, 1926. Serial No. 132,235.

My invention relates to transmission devices for use, primarily upon motor driven vehicles, as automobiles, motor boats and the like, but the same may be used in line shafts and the like wherein it may be found desirable to change the speed ratios between the in-put end and the out-put end of the same.

One of the objects of my new and improved device consists in the combination in one unit of the speed ratios to be obtained and the clutch which heretofore has been composed of two independent units.

A further object of my device consists in providing for a large number of speed changes in the one device.

A still further object of my device consists in provision being made in the device for a reverse drive without the changing of gear ratios.

Additional objects of my device consist in constructing the same in a manner and housing the same in such a way as to prevent the admission of foreign substances or matter within the device.

The invention consists primarily of a primary housing having suitable bearings disposed in either end for the journaling of the main shaft therein and having disposed within the primary housing the operating mechanism and parts which may be easily accessible and open for inspection and adjustment by the removal of the primary housing cover, disposed upon the one side of the same.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:—

Fig. 1 is a side elevation of the assembled device with the housing partially broken away to show the inner construction of the same.

Fig. 2 is a partial cross section view taken on line 2—2 of Fig. 1 looking in the direction indicated.

Fig. 3 is a cross section view taken on line 3—3 of Fig. 2 looking in the direction indicated.

Fig. 4 is a cross section view taken on line 4—4 of Fig. 2 looking in the direction indicated.

Fig. 5 is a cross section view taken on line 5—5 of Fig. 2 looking in the direction indicated.

Fig. 6 is an end elevation, partially in section, of a ball carrying member shown removed from the assembly.

Fig. 7 is a side elevation partially in section of the mechanism shown in Fig. 6.

Fig. 8 is a diagrammatical layout of the ball and the housing for the same and of the surfaces upon which the ball travels, the arrows indicating the action of the ball when a thrust is applied.

Like reference characters refer to like parts throughout the several views:—

I form my primary housing of two parts 1 and 2, joined and secured together through fastening elements 3, as cap screws. Power is applied to the shaft 4 by a prime mover, not here shown. Power is delivered from my device, at the out-put end through shaft 5. Suitable bearings are provided, through the housing, to properly journal the shafts therein. Two clutch faces 6 and 7 are provided, one for each different speed ratio to be obtained. An annular clutch engaging element is provided for each of the clutch faces and actuators are provided for each of the annular clutch engaging elements. The shaft 5 has a flange disposed upon its inner end. Bosses 9 and 10 are formed thereupon to form bearings through which the stub shafts pass that are secured to the annular clutch elements. The annular clutch engaging element 11 has the stub shaft 12 secured thereto. The stub shaft passes through the boss 9 and is secured to the spider 13 by means of the fastening bolt 14. The spider 13 is journaled about the sleeve 15 and in slidable relation with the sleeve. A ring 16 is secured to the outer end of the spider element against which the roller 17 of the clutch actuator yoke 18 is made to engage. A constant normal pressure is maintained between the ring 16 and the roller 17 through the action of compression spring 19. The release of the yoke 18 permits the action of the spring 19 to engage the clutch element 11 with the clutch face 6. I provide a sleeve 15 journaled about the shaft 5 and in slidable relation therewith which mounts and carries the secondary clutch mechanism heretofore described. A ring 20 terminates the outer end of the sleeve 15 and acts as a thrust collar between the compression clutch springs 19 and 21. A normal pressure is placed upon the compression spring 21 through the action of the wearing ring 22 and the threaded pressure adjusting nut 23 which is in threaded engagement with the shaft 5. A roller 24 engages the ring 20 and is actuated by the actuator yoke 25; thus maintaining the yoke 18 in position to prevent the engagement of the clutch faces 11 and 6, whereas the release of the yoke 25 will permit the resultant reaction of the compression spring 21 to force the engagement of the clutch engaging element 26 mounted upon the stub shaft 27 and secured to the flange 29 through the fastening 28. The flange 29 is formed upon the inner end of the sleeve 15.

Power is supplied to the shaft 4 from a prime mover, not here shown, and the shaft is journaled within the bearing 31 secured within the housing 1. The shaft 4 has a feather key 32 seated within the shaft and the sleeve housing 35 may be moved longitudinally of the shaft and upon the key 32. A yoke 33 is adapted to the sleeve housing 35 and is maintained in position and adjustment through the action of the adjusting nut 34. The adjusting nut 34 is in threaded relation with the sleeve housing 35.

The clutch face 6 is formed upon an annular ring 36 having a braking surface formed as shown at 37 upon its outer peripheral surface and upon which a brake band 38 is made to register and engage. The brake band 38 is of the expanding and contracting type as shown in Fig. 3 and is normally expanded through the action of the compressible spring 39. Two ears 40 and 41 are formed upon the terminal ends of the brake band 38 and the journal rod 42 passes therethrough and acts as a bearing for the spring 39. A suitable fastening lock nut 43 is in threaded engagement with the end of the rod 42. The sleeve 46 has a helix face 44. The sleeve 46 is placed about the rod 42 and is in fixed relation with the ear 41 of the brake band. The outer end of the journal rod 42 has a helix face 45 in registering alignment with the helix face 44 and the partial rotation of the journal rod through the action of the bell crank 47 and the actuating lever 48 will compress the spring and apply a braking action upon the brake surface 37. A toggle lever 49 is journaled about the supporting shaft 50 and has its opposite ends in engagement with the crank arms 51 and 52 that are secured to the shafts 53 and 54. The yoke 18 is secured to the shaft 53 and the yoke 25 is secured to the shaft 54. The operating lever 55 is in hinged engagement with the pin 56 that is in fixed relation with the housing. When the operating lever 55 is in the position as illustrated in Fig. 1 the same is in the neutral position and neither the clutch engaging elements nor the braking surfaces are in engagement. In the event that the lever 55 is actuated to the right, as looking at Fig. 1, the clutch will be placed in position for high gear operation in which event the clutch element 26 will be brought into engagement with the clutch face 7. The actuation of the lever 55 in the reverse direction or to the left will disengage the clutch element 26 from the clutch face 7 and will bring the clutch element 11 into engagement with the clutch face 6 and the low gear drive will be engaged. The movement of the lever 55 through the full travel of the same to the left causes the engagement of the boss 56 with the adjustable member 57 mounted upon the rod 48 and applies the brake as heretofore described. This prevents the rotation of the clutch member 36, and at the same time disengages the brake band 58 from the brake surface 59 disposed upon the outer periphery of the band 60. The longitudinal movement of the sleeve housing through the action of the yoke 33 and the actuating lever 61 journaled about the shaft 62 moves the sleeve housing longitudinally of the shaft 4. An internal gear is formed within the inner periphery of the band 59 with which the teeth 63 formed exteriorly of the sleeve housing 35 are adapted to engage when the sleeve housing is moved longitudinally of the shaft. At the time of this engagement of the internal and external gears, the spline 64 is disengaged from the key 65. When this engagement of the internal and external gears takes place the engagement is that of a reverse drive which is accomplished through the action of the ball bearings 66 and 67 carried within the race way and in registering alignment with the race way within the oppositely disposed faces of the annular plate 68 which is provided with a band 60. At the time of the engagement of the internal and the external gears the longitudinal movement of the sleeve housing 35 does not affect the driving compression between the engaging elements, consisting of the ball bearings and the race ways composing the same. The sleeve 69, provided with a flange 70 and the race way 71 disposed upon the side of the flange 70 opposite the friction or clutch face 7 has mounted upon the sleeve portion 69 a compressible spring 72 that engages with the annular ring 73 and causes engagement between the annular ring 73 and the series of ball bearings 66 as well as compression between each of the race ways and the ball bearings operating therein. A suitable working pressure between the ball bearing elements is secured by the placing of a predetermined working pressure upon the compressible spring 72. This predetermined pressure is accomplished through the medium of the adjusting nut 74 which is in threaded engagement with the sleeve 69. A wearing ring 75 is disposed between the adjusting nut 74 and the spring 72. The amount of compression placed within the compression spring will determine the pressure to be maintained between the different component elements of the ball bearing members. The ball bearing elements not only provide for the reversing drive in the clutch but act at the same time as a ball bearing for the main elements composing the clutch as well. If slippage is taken into account between the ball bearing elements through which the reversing and the low speed drives occur most any speed ratio may be obtained below that wherein no slippage may occur to a minimum of speed and the amount of this slippage will determine the speed to obtain which in a measure will be automatic in character as the resistance to be overcome will determine the amount of the slippage.

While the form of mechanism herein shown and described is admirably adapted to accomplish the primary objects stated, it is to be understood that it is not intended to confine the invention to the one form of embodiment herein shown and described, as it is susceptible of embodiment in various forms, all coming within the scope of the claims which follow.

What I claim is:—

1. In a clutch, a drive and a driven shaft, an outer and an inner clutch element upon each shaft, means to cause a selected one of the clutch elements upon the driven shaft to engage a corresponding clutch element upon the drive shaft, balls carried by the outer clutch element upon the drive shaft and bearing upon the inner clutch element upon the drive shaft, an annular plate supported by the aforesaid balls, a sleeve splined for movement axially of the drive shaft, said sleeve when moved in one direction engaging the inner clutch element on the drive shaft, and when moved in the opposite direction engaging said annular plate, and a brake to prevent the rotation of said annular plate whereby when said annular plate is so prevented from rotating, at a time the inner clutch element is rotated by means of the aforesaid sleeve, rotation in the same direction at a lesser speed will be transmitted from the last mentioned inner clutch element, through the medium of said balls, to the outer clutch element upon the drive shaft, and upon engagement of the two aforesaid outer clutch elements ultimately to the driven shaft.

2. In a clutch, a drive and a driven shaft, an outer and an inner clutch element upon each shaft, means to cause a selected one of the clutch elements upon the driven shaft to engage a corresponding clutch element upon the drive shaft, balls carried by the outer clutch element upon the drive shaft and bearing upon the inner clutch element upon the drive shaft, an annular plate supported by the aforesaid balls, a sleeve splined for movement axially of the drive shaft, said sleeve when moved in one direction engaging the inner clutch element on the drive shaft, and when moved in the opposite direction engaging said annular plate, and a brake to prevent the rotation of the outer clutch element upon the drive shaft, whereby when said last mentioned outer clutch element is prevented from rotating at a time the aforesaid annular band is rotated by means of the aforesaid sleeve, rotation in the opposite direction will be imparted from said annular band through the medium of said balls to the inner clutch element upon the drive shaft, and upon engagement of the two aforesaid inner clutch elements, ultimately to the driven shaft.

3. In a device of the class described, a drive and a driven shaft, a pair of drive clutches upon the drive shaft, a pair of driven clutches upon the driven shaft, each pair of clutches being arranged concentric to its respective shaft, one clutch of each pair surrounding the other of each pair, the driven clutches being adapted for movement longitudinally of the driven shaft, including means whereby the outer driven clutch is caused to engage the outer drive clutch at the same time the inner driven clutch is caused to recede from the inner drive clutch, or vice versa, two series of balls carried in bearings on the outer drive clutch, an annular plate provided with ball raceways clasped between said series of balls, a ring, a spring urging said ring upon one of the series of balls thereby causing the other series of balls to bear upon the inner drive clutch, individual band brakes to engage the annular plate and the outer drive clutch respectively, a sleeve splined to the drive shaft adapted for rotating said annular plate when moved in one direction, and to rotate the inner drive clutch when moved in the opposite direction, means for operating said brakes cooperating with the means for shifting the driven clutches, whereby high speed rotation is given the driven shaft when the inner clutches are engaged and the splined sleeve upon the drive shaft rotates the inner drive clutch; low speed when the outer clutches are engaged, the inner drive clutch is rotated, the annular plate is restrained by its brake, thereby decreased rotation being imparted by the inner drive clutch to the other drive clutch through the medium of the aforesaid balls; and reverse rotation is transmitted to the driven shaft when the inner clutches are engaged, the outer drive clutch is restrained by its brake, the annular plate is rotated by said sleeve, which through the medium of said balls imparts reverse rotation to the inner drive clutch.

4. The combination with a drive and a driven shaft, an annular flange formed upon the driven shaft and having its axis in alignment with the axis of the drive shaft, a sleeve provided with a flange carried by the driven shaft, stub shafts, mounted to the last mentioned flange and each passing through the first mentioned flange, a clutch element carried by said stub shafts, an annular spider having the same axis as the driven shaft mounted about said sleeve, stub shafts secured to said spider and each passing through the first mentioned flange, an annular clutch element mounted to the last mentioned stub shafts, a coil spring constantly urging said sleeve and said spider in opposite directions upon said driven shaft, a second coil spring resisting the urge of said sleeve, clutch elements carried by the drive shaft each being adapted to be engaged by one of the first two mentioned clutch elements, a pair of oppositely movable yokes, one being adapted for moving the sleeve against the urge of the second coil spring, the other being adapted for moving the spider against the urge of the first mentioned coil spring, whereby when said yokes approach each other the first mentioned clutch element engages its cooperating clutch element upon the drive shaft, and when said yokes recede from each other, the second mentioned clutch element engages its cooperating clutch element upon the drive shaft, and speed reduction and reversing mechanism cooperating with the clutch elements associated with the drive shaft substantially as described.

THEODORE GENSMER.